Aug. 22, 1939.   K. STUART   2,170,040
COOKING AND BAKING UTENSIL
Filed April 22, 1936   2 Sheets-Sheet 1
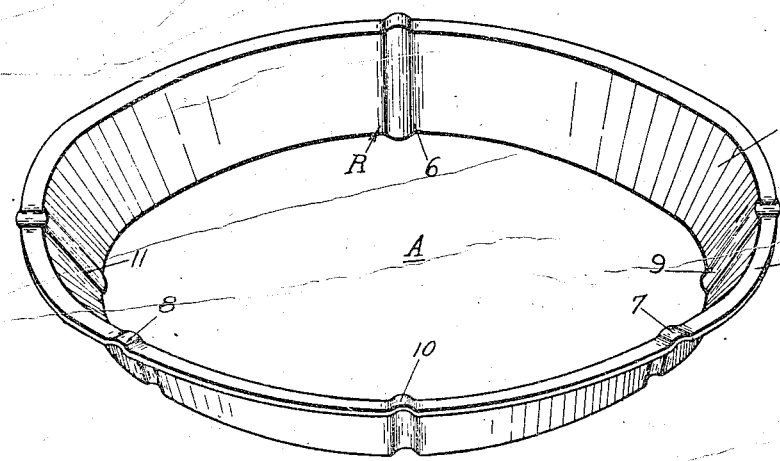
Fig. 1
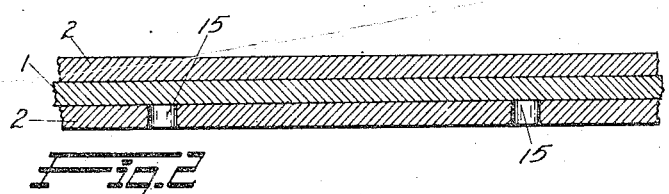
Fig. 2
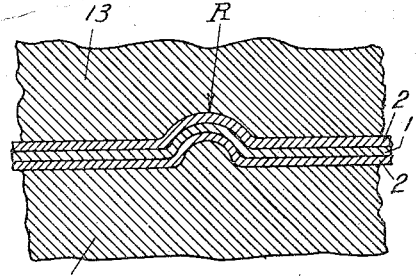
Fig. 3
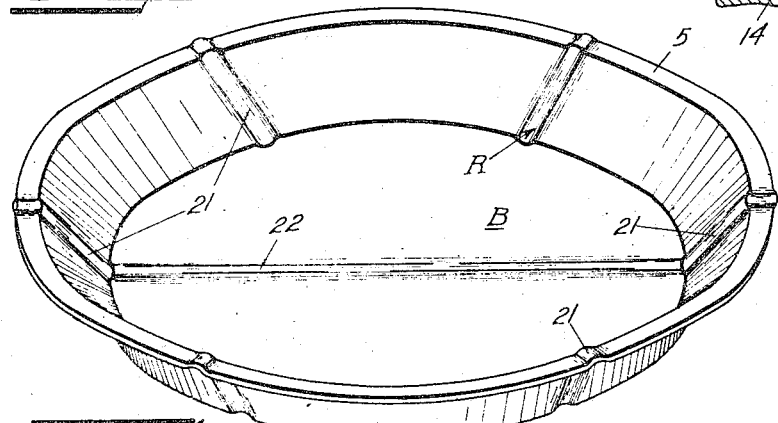
Fig. 4
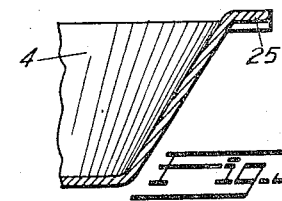
Fig. 8
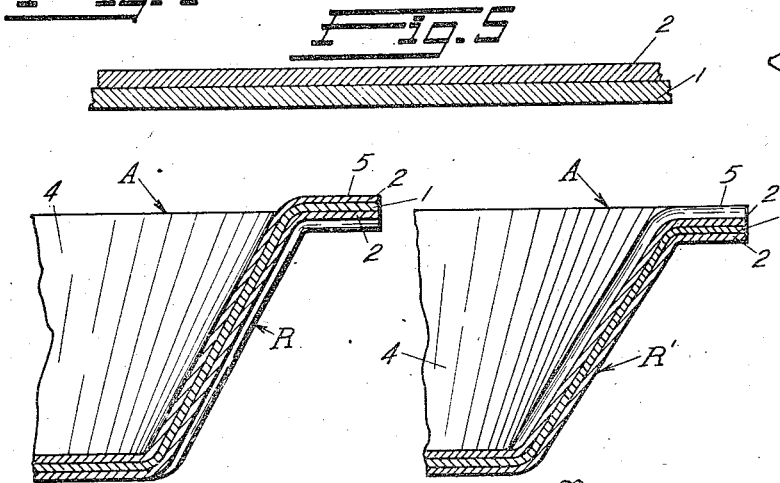
Fig. 5
Fig. 6
Fig. 7
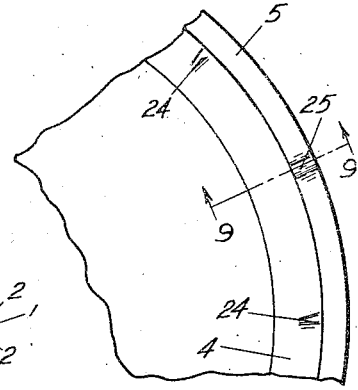
Fig. 9
Inventor
Kimberly Stuart
By Strauch & Hoffman
Attorneys Aug. 22, 1939.     K. STUART     2,170,040
COOKING AND BAKING UTENSIL
Filed April 22, 1936     2 Sheets-Sheet 2
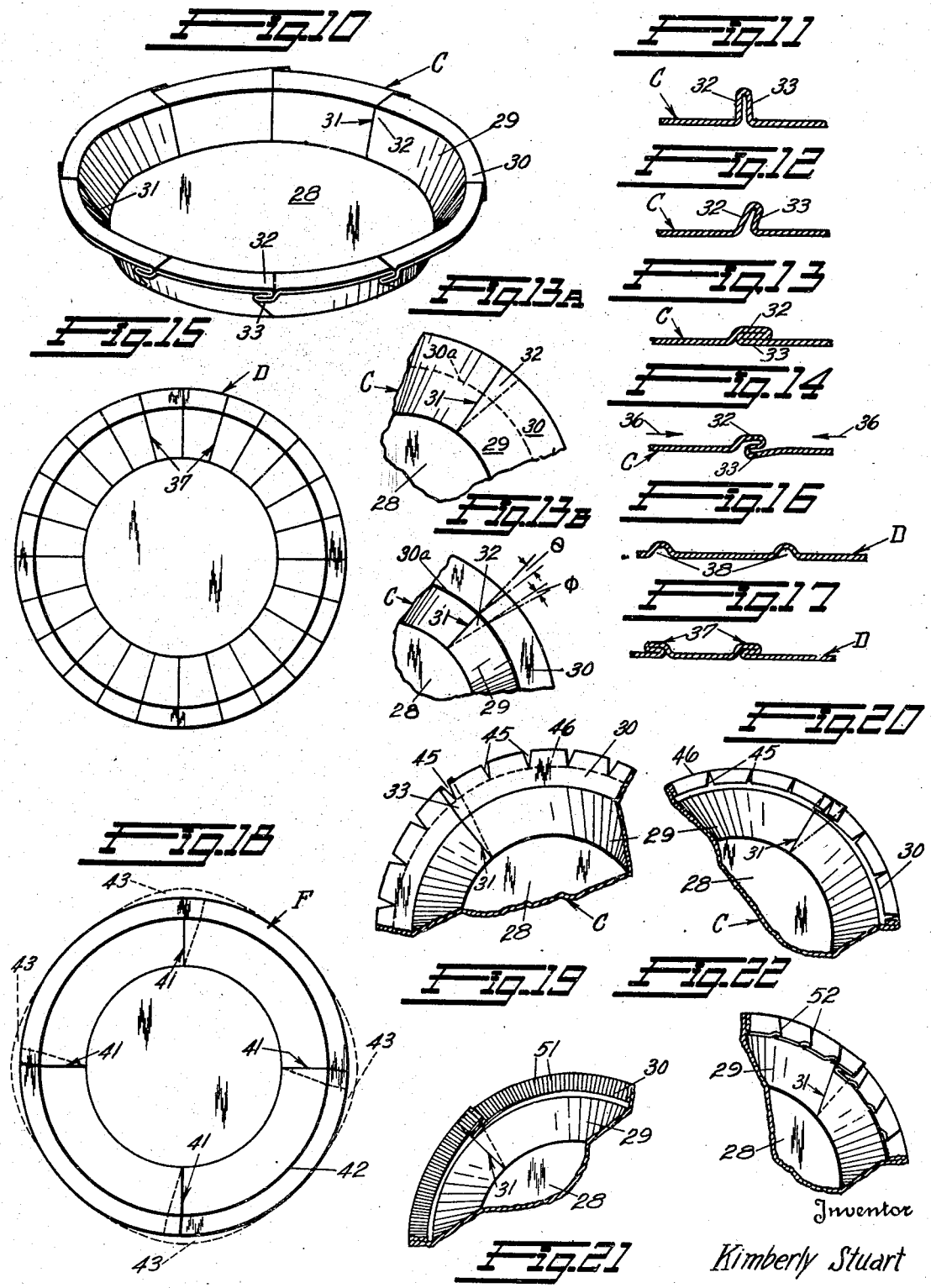
Inventor
Kimberly Stuart
By
Strauch & Hoffman
Attorneys Patented Aug. 22, 1939

2,170,040

UNITED STATES PATENT OFFICE 2,170,040

COOKING AND BAKING UTENSIL

Kimberly Stuart, Neenah, Wis., assignor of one-half to Elizabeth R. B. Stuart, Menasha, Wis.

Application April 22, 1936, Serial No. 75,809

1 Claim. (Cl. 53—6)

My invention relates to cooking utensils and more especially to utensils for baking and methods of manufacturing them.

Heretofore in baking, as in baking bread, puddings, custards, cakes, and pies, it has been substantially universally customary to contain the article or ingredients to be baked in a plate or pan made from some suitable metal, though there has been suggested, and there are obtainable, earthenware and glass containers for cooking and baking purposes.

In Patent No. 2,027,296, issued on January 7, 1936, to the present applicant and Garrett B. Linderman, Jr., there is disclosed a utensil made of aluminum foil and paper laminations which has proved to be entirely satisfactory as a baking and cooking utensil, and it, as a matter of fact, produces a better baked product.

The invention also relates to plain paper utensils. Heretofore plain paper pie plates of fireproof character have been made but in order to produce anything approaching a wrinkle-free product it has been necessary to mold the pulp in place on a vacuum mold, an expensive process.

It is the primary object of this invention to improve the utensil disclosed in the above mentioned patent and to also improve the methods of manufacturing them.

It is an object of this invention to provide a novel inexpensive baking utensil of laminated construction which may be utilized for containing the foods during the cooking or baking process, which is resistant to heat, which will not absorb moisture or grease and which presents smooth wrinkle-free surfaces.

A further important object of my invention is to provide a novel laminated baking utensil for containing the article during the baking process which is provided with a plurality of indicia for facilitating cutting the article into parts of predetermined size, and for insuring freedom of the laminations from wrinkles.

My invention also aims to provide cooking and baking or similar utensils of either laminated or single layer construction which embody corrugations in their side walls and flanges which are operable to reenforce the utensil, allow it to be drawn into form without the production of wrinkles and which provide cutting guides, the flange being turned over to stiffen it and also lock the corrugations in position.

A further object is to make it possible to produce paper pie plates or the like from plain paper stock, thus obviating the necessity for costly pulp molding machinery and to also produce a novel superior utensil.

The present invention also aims to provide further improved utensils over those shown in my copending application Serial No. 59,119, filed January 14, 1936, and the present application is therefore a continuation-in-part of that application.

In the drawings:

Figure 1 is a perspective view of a pan embodying my invention and which is used for pie baking purposes.

Figure 2 is a fragmental sectional view of the bottom of the pan shown in Figure 1.

Figure 3 is a fragmental sectional view of the flange of the pan shown in Figure 1 and illustrates a pair of forming dies in place.

Figure 4 is a view similar to Figure 1 but shows a modified form of pan of my invention.

Figure 5 is a fragmental sectional view of the bottom of the pan of Figure 4.

Figure 6 is a fragmental sectional view illustrating the manner in which the ridges or grooves are formed in the pans of Figures 1 to 5 inclusive.

Figure 7 is a view similar to Figure 6, but illustrates another manner in which the ridges may be formed.

Figure 8 is a fragmental top plan view of a pan illustrating still another manner in which the pans may be ridged.

Figure 9 is a sectional view taken on line 9—9 of Figure 8.

Figure 10 is a perspective view of a further form of pan or plate wherein the corrugations assume the form of closed pleats.

Figures 11, 12 and 13 are fragmental sectional views illustrating the successive steps preferably employed in the manufacture of the pan shown in Figure 10.

Figures 13A and 13B are fragmental plan views of the plate shown in Figure 10 during two stages of its manufacture.

Figure 14 is a fragmental sectional view illustrating the action that takes place when the pan undergoes a thermally induced expansion.

Figure 15 is a top plan view of a further form of plate of the invention.

Figure 16 and 17 are fragmental sectional views illustrating the step of manufacturing the pan shown in Figure 15.

Figure 18 is a top plan view of a pan similar to that shown in Figure 10, but which embodies a smaller number of pleats.

Figure 19 is a fragmental bottom view, in perspective, of a pan similar to that shown in Figure 10, but which embodies a notched flange portion.

Figure 20 is a view similar to Figure 19, but illustrates the plate of that figure as it appears when the rim or flange has been turned over into final position.

Figure 21 is a view similar to Figure 20, but shows a further form of flange structure of my invention.

Figure 22 is a view similar to Figures 20 and 21 but shows a still further flange construction of my invention.

With continued reference to the drawings, wherein like reference characters have been employed to designate like parts throughout the several views thereof, in Figure 1 a plate or pan is indicated at A, which is preferably pressed from a circular blank of fibrous material 1, such as a heavy kraft paper, container board or other suitable fibrous material, on both sides of which has been cemented a coating of metallic foil 2, the fibrous material serving as a backing for the thin foil surfaces. In the drawings, the thickness of the paper and foil sheets has been exaggerated for the purpose of clarifying the showing. The fibrous material is only visible at the edges because it is completely covered on both sides with metallic foil 2. The pan is illustrated as having a sloping wall 4 and a flange 5, and these parts are provided with ridges or grooves R, so that the fibrous material will not have to be stretched so much that it will rupture the foil coating when the blank is pressed into the shape of a pan and these ridges are also spaced around the pan in such manner as to facilitate cutting the pie or cake into pieces of predetermined size.

With reference to Figure 1, I have provided pan A with ridges 6, 7, 8, 9, 10, and 11. Ridges 6, 7 and 8 are shown as dividing the pan into thirds whereas ridges 6, 9, 10, and 11 divide the pan into quarters. If desired the ridges or grooves may be spaced in any other suitable manner around the pan periphery to enable the consumer to cut the pie or cake into proper divisions. When the pie or cake has been baked in these pans the ridges or grooves on sloping walls 4 are of course, covered by the product but the ridges or grooves in the flange 5 are visible and constitute indicia to guide the cutting operation.

Although I have shown the ridges or grooves of the sloping wall as being equal in number to, and merging with those formed in flange 5, it is to be understood that, if desired, they may be unequal in number and those formed in the sloping wall may be disposed out of alignment with those formed in the flange, so long as the latter are properly spaced to divide the food product into pieces of the proper desired size, and the appended claims are intended to embrace my invention when it assumes this form.

As seen in Figures 3 and 6, ridges R are pressed or embossed upwardly out of the plane of the pan, and in Figure 3 I have shown upper and lower dies 13 and 14 for performing this operation. If desired the ridges may be reversed and embossed downward creating grooves. It has been found that when ungrooved dies are used for forming the pan, unsightly haphazard wrinkles will develop when the drawing operation is effected, whereas with my invention, by which definite ridges are deliberately provided in the pan, the surface of the foil between the ridges is perfectly smooth.

The bottom of the pie pan is preferably provided with small perforations 15 on the bottom only, as seen in Figure 2. These perforations are for the purpose of allowing the escape of moisture which may be contained in the fibrous backing, during the baking operation. In some instances, when an imperforate bottom foil sheet has been used I have found that the foil will blister and separate from the fibrous backing. The upper sheet of foil is preferably imperforate because the moisture may readily escape through the bottom foil sheet and also, if the upper foil sheet were perforate, grease or fruit juices would possibly soak into the fibrous backing. Another reason for perforating the lower, rather than the upper foil sheet resides in the fact that there is no chance for the food product to come into contact with the adhesive employed to hold the laminations together. The material used for the laminations and the adhesive and methods of uniting them will be hereinafter set forth.

Figure 4 shows another form of the invention. In this form I use metallic foil 2 only on the inside of the pan B. In this case the fibrous material is preferably treated chemically so as to resist the heat of baking without charring. The treatment described by Herting in his Patents Nos. 1,699,843, issued January 22, 1929, and 1,804,417 issued May 12, 1931, can be used for this purpose and I have also found that when fire clay is incorporated in the fibrous material during its manufacture it will withstand baking temperatures without the necessity of any other treatment. In this form of the invention it is not necessary to perforate the foil because any moisture present can escape through the bottom, where there is no foil coating.

The principal reason for using foil on the inner surface only is to save the cost of the coating on the bottom. In this way baking and cooking utensils can be made considerably cheaper than when foil is used on both surfaces, without impairing the baking and cooking properties thereof. This type of utensil, however, will not stand washing as well as the type with foil on both surfaces, and it generally can be used only once. Moreover, this type of utensil does not possess the sales appeal of the type with foil on both sides, and therefore if the article is to be marketed in the utensil, it is preferable to use the one shown in Figures 1 and 2.

In this form of the invention pan B is provided with six symmetrically disposed ridges 21, whereby the pie or cake can be accurately cut into sixths, thirds or halves. If desired, two additional properly spaced ridges may be provided so that the pie or cake can be cut into quarters. In these figures I have also illustrated one manner in which a ridge may be used to reenforce the pan and also take up surplus material in the bottom of the pan during the drawing operation. In this instance a ridge 22 is provided which merges with two of the ridges 21 of sloping wall 4.

In Figure 7 I have illustrated a pan A similar to that shown in Figure 1, but in this construction ridge R' is pressed downwardly out of the plane of the pan body.

I have illustrated utensils having a sloping wall and a flange and have provided a ridge in both the sloping wall and flange. It is to be understood, however, that where the shape or construction of the utensil requires less drawing action in some regions than others the ridges may be of discontinuous formation and may also be of non-uniform section throughout their length.

In Figures 8 and 9 I have shown a pan of this character. In this form of the invention sloping wall 4 is provided with a plurality of preferably symmetrically arranged ridges 24, which are seen to decrease in depth toward the bottom of the pan and terminate short of the bottom. Flange 5 is provided with a plurality of properly spaced marking and drawing ridges 25.

By reason of the impervious character of the foil sheets and the waterproof adhesive employed to hold them together, the utensils (made with foil on both sides) may be washed with soap and water without damaging them in any way.

In Figure 10 I have illustrated a further form of plate C, wherein the corrugations assume the form of closed pleats. As seen in Figure 10, a plurality of pleats 31 are provided in the plate to divide the latter into eight portions, although it is to be understood, as stated in connection with the previously described forms of invention, the pleats may be more or less in number, depending upon the size of portions desired. Each plate is made up of a bottom wall 28, a side wall 29 and a rim or flange 30. The plate is pleated so as to provide a fold 32 overlying the inner surface of the plate and a fold 33 overlying the outer surface of the plate. As seen in Figure 10 the fold in the side wall of the plate extends continuously into the flange 30 of the plate.

I have found that by pleating the plates in the manner shown in Figure 10, the material, whether it is laminated or is made of plain paper or other flexible material, is smoothly pulled into shape without the formation of wrinkles, and that the pleats, in addition to serving the function of providing cutting guides for the food or other product contained in the plate, also materially reinforce the side wall and the flange of the plate.

The pleats may be formed in the plate in any suitable manner. For instance with reference to Figure 11, they may first be brought into the form illustrated in that figure by a preliminary drawing operation and then turned down into the intermediate position shown in Figure 12, and then finally clamped into the final position shown in Figure 13. Any suitable means may be employed to form the plate, as for instance, a plurality of dies having proper configuration.

Referring to Figures 13A and 13B, I have diagrammatically illustrated the self locking pleat formation that results when the flange is formed on the plate. Although the flange may be simultaneously formed with the sloping wall of the plate, I have, for clarity of illustration, shown the parts as they would appear if the plate was formed in two separate bending operations. In Figure 13A the plate is shown as it appears before the flange is formed along line 30a. It is observed that the two lines defining the edges of pleats 31 are straight throughout their length.

In Figure 13B the flange has been formed by bending the blank along line 30a, and during this operation it is observed that pleat 31 opens up to some extent to accommodate the increasing circumference of flange 30. The edges of pleat 31, accordingly, assume the form of broken lines, and in Figure 13B I have indicated the angles between the broken portions of the lines as $\theta$ and $\phi$.

It is therefore apparent that there is a strong tendency for the parts to remain in pleated position once they have been firmly creased down in the position shown in Figure 13B. It is therefore desirable, if the plates are made in a two step process, to only partially crease the parts when they are in the position shown in Figure 13A, and to fully crease them when they are in the final position of Figure 13B.

I have found that a plate pleated in the manner just described is particularly useful in cooking or baking as the expansion of the material induced by heating tends to force the parts of the pleats into more intimate engagement. For instance, referring to Figure 14, which shows a partially open pleat, the forces set up by the thermally induced expansion act in the direction indicated by the arrows 36, with the result that parts of the pleat are urged into the position shown in Figure 13. This is particularly emphasized when the material is coated on one or both sides by metal foil, which has a relatively high coefficient of expansion.

In Figures 15, 16 and 17 I have illustrated a further form of corrugated plate D. As seen in Figure 15, the pleats 37 occur comparatively close together all the way around the plate. This plate may be made in any desired manner. For instance, the body of the plate may be provided with shallow scores or corrugations 38 as indicated in Figure 16. The blank may then be placed between a pair of plain dies having smooth surfaces corresponding to the shape of the finished utensil and pressure applied thereto. When the pressure is applied, the blank will "draw" and the side wall of the plate will naturally tend to contract upon itself. This tendency is controlled or aided by the score lines or corrugations 38 so as to cause comparatively small pleats 37 to be formed therein as the dies are brought into final position. Although the formation of the pleats in this form of the invention is somewhat haphazard i. e. as seen in Figure 17, there is no particular control over which way the pleats will fold, the resulting product is nevertheless far superior to the plates of the prior art as the side walls of the plate are rendered comparatively stiff and completely free from unsightly haphazard wrinkles by the pleating operation.

In Figure 18, I have shown a plate F which is somewhat similar to that shown in Figure 10, but it is provided with only four pleats 41. I have discovered that when a plate is made up embodying comparatively few pleats such as three or four, the drawing action which takes place in forming the plate results in distorting the plate from true circular formation. This, however, has been overcome in the present instance by employing a blank 42, which prior to folding, embodies four projecting portions 43, which provide an excess of material where the pleats are formed, with the result that when the plate is brought into final form it is circular in outline.

In Figures 19 and 20 I have illustrated the pleated plate C of Figure 10 as being provided with a turned over flange. With reference to Figure 19, the flange 30 of the plate is made rather wide and is provided with a plurality of notches 45, which as seen in Figure 19, extend down to a line 46. Notches 45 may be made in the blank either before or after it has been brought into pleated form. As seen in Figure 19 one of the pleats 31 is provided with a notch 45, but there is no particular relationship between the notches and the pleats and they accordingly may be placed in the blanks at random or in any desired position.

After the blank or formed plate has been notched as just described, it is placed in a die or other suitable apparatus and the outer part of the rim is turned under along the line 46 so as to form a neat folded-over rim as seen in Figure 20. In this figure it is seen that the folding operation has partially closed notches 45, and therefore, there is no tendency for the material to wrinkle during this operation.

The turned over rim of the plate performs three important functions. In the first place it augments the self-locking action described in connection with Figures 13A and 13B and firmly locks pleats 31 in closed condition. It also gives the plate a neat appearance and smooth outer edge. It also performs the highly important function of stiffening the flange of the plate where its strength is particularly desired.

Another way in which to produce a turned-over flange is shown in Figure 21, wherein the margin of the plate is provided with a plurality of finely spaced corrugations of score lines 51, which take up the excess material produced by turning over the flange and yet which allow the flange to lie substantially flat.

In Figure 22 I have illustrated a plate with a turned-over edge, wherein the margin of the plate has merely been slit at 52, with the result that when the plate edge is turned over the material slightly overlaps as seen in Figure 22.

Because of the thinness of the laminations, and also in view of the fact that the invention is applicable to plain paper plates as well as plates of laminated material, I have in Figures 10 to 22 inclusive merely indicated the material as being of single ply construction. It is to be understood, however, that these figures are illustrative of the invention irrespective of whether it is applied to laminated or single ply paper plates. Also, the forms of the invention shown in Figures 1 to 9 inclusive may also be embodied in the form of single ply plates, and the appended claims are intended to embrace the invention when it assumes that form.

I will now describe the materials and methods preferably employed in forming the laminated plates of the invention, and for the purpose of setting forth a concrete embodiment of the invention I will describe it as applied to a utensil made up of paper and foil laminations.

The metallic foil may be of any desired character, but I find aluminum foil to be particularly desirable as it has a high heat conductivity and may be obtained at comparatively low cost in continuous sheets which are free from surface imperfections. The foil may be of any suitable thickness, but it is preferably approximately four ten-thousandths of an inch thick. It is to be understood, however, that the foil may be thicker or thinner, depending upon the nature of the utensil involved and the results desired.

The fibrous material may assume various forms but heavy kraft paper, container board, or other suitable fibrous material or its equivalent is preferably employed.

Any suitable adhesive may be employed to secure the laminations together, but I preferably use a latex adhesive made as follows, and which has proven entirely satisfactory for the purpose as it is heat-resistant and water-proof.

Plymax (modified casein that is soluble in water) is dissolved in lime and NaF preferably according to the following procedure. 18.3 parts lime and 10 parts NaF are mixed to a uniform suspension in 275 parts water and 100 parts "Plymax added to the mixture with constant agitation. Stirring should be continued for at least 15 minutes and then the batch set aside for 15 minutes longer. 275 parts water then added to this followed by another period of agitation of 15 minutes. The character of the adhesive can be varied considerably by the additions of latex (60%). The range of addition is from 100 to 250 parts. The mixture with 175 parts latex is especially suited as a water-proof adhesive and as an adhesive to withstand extreme temperatures. It is advisable to add an anti-oxidant in the ratio of 3 parts.

The material (whether it consist of one or two foil sheets and a fibrous sheet) may be laminated in any suitable manner, but I preferably coat the paper and/or the foil with the fluid adhesive and then substantially immediately pass the laminations between a pair of rollers under pressure, preferably at room temperature, to effect an intimate bond between the laminations. This may be conveniently carried out on a production scale by feeding the various laminations from rolls into a machine wherein the adhesive is applied to the laminations and then immediately passed through the pressure or "marrying" rolls in a continuous operation. It has been found that although substantially no time elapses between the application of the adhesive and the application of pressure to the sheets between the marrying rollers, and the adhesive embodies a considerable quantity of water, the adhesive nevertheless sets into a dry, flexible mass and the fibrous body remains dry even when two layers of metal foil are used. It is believed that this may possibly be due to a catalytic action set up by the foil, which brings about a polymerization of the adhesive.

The various utensils disclosed are formed from the laminated material just described in any suitable manner. It is not necessary to allow the laminated material to stand until the adhesive has thoroughly set or dried, which with the adhesive disclosed usually requires several days. Blanks of the proper size may be cut from the material on or after the day the material has been laminated and then pressed into proper shape between dies 13 and 14 as previously described. The dies may be cold or slightly heated during the forming process. If desired, several utensils may be formed in the same operation.

The perforations in the bottom foil sheet of the preferred form of the invention are more conveniently put in during the laminating of the stock by small wheels with many points on them rolling against the side of the stock which is to form the bottom of the utensil as it comes off the marrying rollers in finished condition. It is essential that when stock with foil on both sides is being formed, the die be used cold or only slightly heated. Otherwise, the sudden heat will vaporize any residual moisture in the fibrous backing faster than it can escape through the small perforations and cause the foil to blister and separate from the fibrous backing. It is not necessary to perforate the foil on the bottom side before the pan is formed as I have found that this can be successfully done after the pan has been formed. It is, however, more convenient to do it at the time the stock is laminated. In making the utensils with foil on both top and bottom it is not necessary to treat the fibrous material chemically to withstand the heat used in baking. In most cases the metallic foil coating amply protects it. However, for some purposes I prefer to treat the fibrous material chemically as described above, before laminating, and the appended claims are accordingly intended to embrace the invention irrespective of the nature of the fibrous sheet.

In any event it is generally necessary, especially when forming comparatively deep pans, or when very thin foil is used, to so design the corrugations on the sides of the utensils in such a way that the blank can be made to take the desired shape without undue compression or stretch. Too much compression or stretch of the laminated blank causes the foil to rupture and thus results in an imperfect product.

When the plate assumes the form of a single ply paper plate it is preferable to fire-proof the material. This may be done in any suitable manner. For instance, the treatment described in the previously mentioned Herting patents may be employed, or fire clay may be embodied in the paper stock during the course of its manufacture so as to fire-proof it.

The term "corrugations" as employed in the appended claims is used in its broad sense and hence embraces the open corrugations shown in Figures 1 to 9 inclusive and the closed corrugations or pleats or folds shown in Figures 10 to 22 inclusive.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A shallow plate made by pressure drawing operations from a single sheet of semi-flexible material comprising a bottom wall, an upwardly sloping side wall and a marginal flange, said bottom wall and said flange being disposed substantially parallel, and a plurality of spaced closed full pleats extending from said bottom wall upwardly along said side wall and across said flange, said pleats each including at least three bends in said material and comprising excess material resulting from said drawing operations and being folded flat closely against the external surfaces of said side wall and said flange in such a manner that the two outside bends of each pleat are tightly drawn together with those portions of the side wall and flange respectively which lie between the pleats being substantially in alignment so that smooth, aligned, substantially continuous surfaces are provided within the plate and across the top of the flange.

KIMBERLY STUART.